US012705456B2

(12) United States Patent
Uria-Martínez et al.

(10) Patent No.: US 12,705,456 B2
(45) Date of Patent: Aug. 11, 2026

(54) GENERATING SPATIAL EMBEDDINGS BY INTEGRATING AGENT MOTION AND OPTIMIZING A PREDICTIVE OBJECTIVE

(71) Applicant: GDM Holding LLC, Mountain View, CA (US)

(72) Inventors: Benigno Uria-Martínez, London (GB); Andrea Banino, London (GB); Borja Ibarz Gabardos, London (GB); Vinicius Zambaldi, London (GB); Charles Blundell, London (GB)

(73) Assignee: GDM Holding LLC, Mountain View, CA (US)

( * ) Notice: Subject to any disclaimer, the term of this patent is extended or adjusted under 35 U.S.C. 154(b) by 976 days.

(21) Appl. No.: 17/914,066

(22) PCT Filed: May 12, 2021

(86) PCT No.: PCT/EP2021/062704

§ 371 (c)(1),
(2) Date: Sep. 23, 2022

(87) PCT Pub. No.: WO2021/228985

PCT Pub. Date: Nov. 18, 2021

(65) Prior Publication Data

US 2023/0124261 A1 Apr. 20, 2023

Related U.S. Application Data

(60) Provisional application No. 63/025,477, filed on May 15, 2020.

(51) Int. Cl.
*G06N 3/044* (2023.01)
*G06N 3/045* (2023.01)

(52) U.S. Cl.
CPC ............. *G06N 3/044* (2023.01); *G06N 3/045* (2023.01)

(58) Field of Classification Search
CPC ............................... G06N 3/044; G06N 3/045
See application file for complete search history.

(56) References Cited

U.S. PATENT DOCUMENTS

2020/0051252 A1 2/2020 Brown et al.
2020/0134425 A1 4/2020 Chen et al.

FOREIGN PATENT DOCUMENTS

CN 110088774 A 8/2019
WO WO-2019170905 A1 * 9/2019 ............. G06N 3/088

OTHER PUBLICATIONS

Beeching et al., Ego Map: Projective mapping and structured egocentric memory for Deep RL. arXiv preprint arXiv:2002.02286. Jan. 24, 2020.*

(Continued)

*Primary Examiner* — Adam C Standke
(74) *Attorney, Agent, or Firm* — Fish & Richardson P.C.

(57) ABSTRACT

Methods, systems, and apparatus, including computer programs encoded on a computer storage medium, for training a spatial embedding neural network that is configured to process data characterizing motion of an agent that is interacting with an environment to generate spatial embeddings. In one aspect, a method comprises: processing data characterizing the motion of the agent in the environment at the current time step using a spatial embedding neural network to generate a current spatial embedding for the current time step; determining a predicted score and a target score for each of a plurality of slots in an external memory, wherein each slot stores: (i) a representation of an observation characterizing a state of the environment, and (ii) a spatial embedding; and determining an update to values of (Continued)

the set of spatial embedding neural network parameters based on an error between the predicted scores and the target scores.

19 Claims, 5 Drawing Sheets

(56) References Cited

OTHER PUBLICATIONS

Zhang, Jingwei, et al. "Neural slam: Learning to explore with external memory." arXiv preprint arXiv:1706.09520 (Year: 2017).*
Oh, Junhyuk et al., "Control of memory, active perception, and action in minecraft." International conference on machine learning. PMLR (Year: 2016).*
Office Action in European Appln. No. 21726089.2, dated Mar. 18, 2024, 11 pages.
Alexander et al., "Egocentric boundary vector tuning of the retrosplenial cortex," Science Advances, Feb. 2020, 6(8):eaaz2322.
Banino et al., "Vector-based navigation using grid-like representations in artificial agents," Nature, May 2018, available online May 9, 2018, 557(7705):429-433 (21 pages including the supplemental material).
Barry et al., "Experience-dependent rescaling of entorhinal grids," Nature Neuroscience, Jun. 2007, available online May 7, 2007, 10(6):682-684, 3 pages.
Barry et al., "The boundary vector cell model of place cell firing and spatial memory," Reviews in the Neurosciences, 2006, 17(1-2):71-97.
Beattie et al., "Deepmind lab," CoRR, Submitted on Dec. 12, 2016, arXiv:1612.03801v1, 11 pages.
Bicanski et al., "A neural-level model of spatial memory and imagery," Sep. 2018, eLife, 7:e33752, 45 pages.
Blum et al., "A model of spatial map formation in the hippocampus of the rat ," Neural Computation, Jan. 1996, 8(1):85-93.
Byrne et al., "Remembering the past and imagining the future: a neural model of spatial memory and imagery," Psychological Review, Apr. 2007, 114(2):340-375.
Cueva et al. "Emergence of grid-like representations by training recurrent neural networks to perform spatial localization," CoRR, Submitted on May 21, 2018, arXiv:1803.07770v1, 19 pages.
Dordek et al., "Extracting grid cell characteristics from place cell inputs using non- negative principal component analysis," eFlie, May 2016, 5:e10094, 36 pages.
Eichenbaum, "Hippocampus: cognitive processes and neural representations that underlie declarative memory," Neuron, Sep. 2004, 44(1):109-120.
Engel et al., "LSD-SLAM; large-scale direct monocular SLAM," European Conference on Computer Vision, 2014, pp. 834-849.
Espeholt, et al., "Impala: scalable distributed deep-rl with importance weighted actorlearner architectures," CoRR, Submitted on Feb. 5, 2018, arXiv:1802.01561v1, 21 pages.
Foster et al., "Reverse replay of behavioural sequences in hippocampal place cells during the awake state," Nature, Mar. 2006, available online Feb. 12, 2006, 440(7084):680-683.
Franzius et al., "Slowness and sparseness lead to place, head-direction, and spatial-view cells,", PLoS Computational Biology, 2007, 3(8):e166, 18 pages.
Friston et al., "Predictive coding under the free-energy principle," Philosophical Transactions of the Royal Society B: Biological Sciences, May 2009, 364(1521):1211-1221.
Fuhs et al., "Synaptic learning models of map separation in the hippocampus," Neurocomputing, Jun. 2000, 32-33:379-384.
Gothard et al., "Binding of hippocampal CAI neural activity to multiple reference frames in a landmark-based navigation task," Journal of Neuroscience, Jan. 1996, 16(2):823-835.
Hafting et al., "Microstructure of a spatial map in the entorhinal cortex," Nature, Aug. 2005, available online Jun. 19, 2005, 436(7052):801-806.
Hartley et al., "Modeling place fields in terms of the cortical inputs to the hippocampus," Hippocampus, 2000, 10(4):369-379.
Hassabis et al., "The construction system of the brain," Philosophical Transactions of the Royal Society B: Biological Sciences, May 2009, 364(1521):1263-1271.
Hayman et al., "Context-specific acquisition of location discrimination by hippocampal place cells," European Journal of Neuroscience, Nov. 2003, 18(10):2825-2834.
Hinman et al., "Neuronal representation of environmental boundaries in egocentric coordinates," Nature Communications, Jun. 2019, 10:2772, 8 pages.
Hinton et al., "Distributed representations," Carnegie-Mellon University, Oct. 1984, 34 pages.
International Preliminary Report on Patentability in International Appln. No. PCT/EP2021/062704, dated Nov. 24, 2022, 11 pages.
International Search Report and Written Opinion in International Appln. No. PCT/EP2021/062704, dated Aug. 12, 2021, 17 pages.
Jonschowski et al., "PVEs: Position-Velocity Encoders for Unsupervised Learning of Structured State Representations," CoRR, arXiv:1705.09805v3, Jul. 24, 2017, 7 pages.
Kim et al., "Ring attractor dynamics in the *Drosophila* central brain," Science, May 2017, 356(6340):849-853.
Klein et al., "Parallel tracking and mapping for small AR workspaces," Proceedings of the 2007 6th IEEE and ACM International Symposium on Mixed and Augmented Reality (IEEE Computer Society, 2007), pp. 1-10.
Kumaran et al., "An unexpected sequence of events: mismatch detection in the human hippocampus," PLoS Biology, Dec. 2006, 4(12):e424, 11 pages.
Lee et al., "Memory of sequential experience in the hippocampus during slow wave sleep," Neuron, Dec. 2002, 36(6):1183-1194.
Leutgeb et al., "Independent codes for spatial and episodic memory in hippocampal neuronal ensembles," Science, Jul. 2005, 309(5734):619-623.
Lever et al., "Boundary vector cells in the subiculum of the hippocampal formation," Journal of Neuroscience, Aug. 2009, 29(31):9771-9777.
Lisman et al., "Prediction, sequences and the hippocampus," Philosophical Transactions of the Royal Society B: Biological Sciences, May 2009, 364(1521):1193-1201.
Morris et al., "Spatial localization does not require the presence of local cues," Learning and Motivation, May 1981, 12(2):239-260.
Moser et al., "Place cells, grid cells, and memory," Cold Spring Harbor Perspectives in Biology, 2015, 7:a021808, 16 pages.
Muller et al., "The effects of changes in the environment on the spatial firing of hippocampal complex-spike cells," Journal of Neuroscience, Jul. 1987, 7(7):1951-1968.
O'Craven et al., "Mental imagery of faces and places activates corresponding stiimulus-specific brain regions," Journal of Cognitive Neuroscience, Nov. 2000, 12(6):1013-1023.
O'Keefe et al., "Geometric determinants of the place fields of hippocampal neurons," Nature, May 1996, 381(6581):425-428.
O'Keefe et al., "The hippocampus as a spatial map. Preliminary evidence from unit activity in the freely-moving rat," Brain Research 34(1):171-175.
Pfeiffer et al., "Hippocampal place-cell sequences depict future paths to remembered goals," Nature, May 2013, available online Apr. 17, 2013, 497(7447):74-79, (8 pages including the supplemental material).
Poulter et al., "Vector trace cells in the subiculum of the hippocampal formation," bioRxiv, Oct. 2019, 43 pages.
Rao et al., "Predictive coding in the visual cortex: a functional interpretation of some extra-classical receptive-field effects," Nature Neuroscience, Jan. 1999, 2(1):79- 87.
Raudies et al., "Modeling boundary vector cell firing given optic flow as a cue," PLoS Computational Biology, Jun. 2012, 9(6) e1002553, 17 pages.
Redish et al., "A coupled attractor model of the rodent head direction system," Network: Computation in Neural Systems, 1996, 7(4):671-685.
Rivard et al., "Representation of objects in space by two classes of hippocampal pyramidal cells," The Journal of General Physiology, Jul. 2004, 124(1):9-25.

(56) References Cited

OTHER PUBLICATIONS

Savinov et al., "Episodic curiosity through reachability," CoRR, Aug. 6, 2019, arXiv:1810.02274v5, 27 pages.
Schiller et al., "Memory and space: towards an understanding of the cognitive map," Journal of Neuroscience, Oct. 2015, 35(41):13904-13911.
Seelig et al., "Neural dynamics for landmark orientation and angular path integration," Nature, May 2015, 521(7551):186-191.
Sharp et al., "The anatomical and computational basis of the rat head-direction cell signal," Trends in Neurosciences, May 2001, 24(5):289-294.
Sharp, "Computer simulation of hippocampal place cells," Psychobiology, 1991, 19(2):103-115.
Skaggs et al., "A model of the neural basis of the rat's sense of direction," Advances in Neural Information Processing Systems, 1995, pp. 173-180.
Solstad et al., "From grid cells to place cells: a mathematical model," Hippocampus, 2006, 16(12):1026-1031.
Solstad et al., "Representation of geometric borders in the entorhinal cortex," Science, Dec. 2008, 322(5909):1865-1868.
Stachenfeld et al., "The hippocampus as a predictive map," Nature Neuroscience, Nov. 2017, available online Oct. 2017, 20(11):1643-1653 (13 pages including the supplemental material).
Sussillo et al., "Opening the black box: low-dimensional dynamics in high-dimensional recurrent neural networks," Neural Computation, Mar. 2013, 25(3):626-649.
Taube et al., "Head-direction cells recorded from the postsubiculum in freely moving rats. II. Effects of environmental manipulations," Journal of Neuroscience, Feb. 1990, 10(2):436-447.
Wang et al., "Egocentric coding of external items in the lateral entorhinal cortex," Science, Nov. 2018, 362(6417):945-949.
Whittington et al., "Generalisation of structural knowledge in the hippocampal-entorhinal system," Advances in Neural Information Processing Systems, 2018, 12 pages.
Zhang et al., "Representation of spatial orientation by the intrinsic dynamics of the head-direction cell ensemble: a theory," Journal of Neuroscience, Mar. 1996, 16(6):2112-2126.
Zipser, "A computational model of hippocampal place fields," Behavioral Neuroscience, 1985, 99(5):1006-1018.
Office Action in Chinese Appln. No. 202180023280.6, mailed on May 15, 2025, 10 pages (with English translation).
Ying et al., "Survey on Image Classification Technology Based on Small Sample Learning," Acta Automatica Sinca, Feb. 2021, 47(2):297-315.

* cited by examiner

GENERATING SPATIAL EMBEDDINGS BY INTEGRATING AGENT MOTION AND OPTIMIZING A PREDICTIVE OBJECTIVE

CROSS-REFERENCE TO RELATED APPLICATION

This application is a National Stage Application under 35 U.S.C. § 371 and claims the benefit of International Application No. PCT/EP2021/062704, filed May 12, 2021, which claims priority to U.S. Application No. 63/025,477, filed May 15, 2020, the disclosure of which is incorporated herein by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system and method implemented as computer programs on one or more computers in one or more locations for training a spatial embedding neural network having a set of spatial embedding neural network parameters. The spatial embedding neural network is configured to process data characterizing motion of an agent that is interacting with an environment to generate spatial embeddings.

As used throughout this specification, an "embedding" refers to an ordered collection of numerical values, e.g., a vector or matrix of numerical values.

In more detail, an example method comprises, for each of a plurality of time steps, obtaining, e.g. inputting, and processing data characterizing the motion of the agent in the environment at the current time step using a spatial embedding neural network, e.g. a recurrent neural network, to generate a current spatial embedding for the current time step. The method determines a predicted score and a target score for each of a plurality of slots in an external memory, wherein each slot stores: (i) a representation of an observation characterizing a state of the environment, and (ii) a spatial embedding. The predicted score for each slot measures a similarity between: (i) the current spatial embedding, and (ii) the spatial embedding corresponding to the slot. The target score for each slot measures a similarity between: (i) a current observation characterizing the state of the environment at the current time step, and (ii) the observation corresponding to the slot. The method determines an update to values of the set of spatial embedding neural network parameters based on an error between the predicted scores and the target scores.

In implementations the method further comprises, for each of the plurality of time steps, processing the current observation and the current spatial embedding using an action selection neural network to generate an action selection output, and selecting an action to be performed by the agent at the current time step using the action selection output.

In some implementations the environment is a real-world environment, the agent is a mechanical agent navigating through the real-world environment, and the actions control the movement of the agent in the environment, i.e. the action selection system selects actions to enable the agent to perform a task that involves navigating through the environment.

In some implementations either the environment is a real-world environment and the agent is a mechanical agent, or the environment is a simulated environment and the agent is implemented as one or more computer programs. The method may comprise using the trained spatial embedding neural network to enable a mechanical agent to navigate through a new, real-world environment. That is, the spatial embedding neural network may be trained in the real world or in simulation, but the trained spatial embedding neural network may then be used in the real world.

Navigating through the new, real-world environment may comprise processing data characterizing the motion of the mechanical agent in the real-world environment using the trained spatial embedding neural network to generate spatial embeddings. An action selection system, in particular an action selection neural network of the action selection system, may be used to process the spatial embeddings to select actions to be performed by the mechanical agent to control the movement of the agent in the new, real-world environment to navigate through the new, real-world environment.

According to one aspect there is provided a method performed by one or more data processing apparatus for training a spatial embedding neural network having a set of spatial embedding neural network parameters that is configured to process data characterizing motion of an agent that is interacting with an environment to generate spatial embeddings, the method comprising, for each of a plurality of time steps: processing data characterizing the motion of the agent in the environment at the current time step using a spatial embedding neural network to generate a current spatial embedding for the current time step; determining a predicted score and a target score for each of a plurality of slots in an external memory, wherein each slot stores: (i) a representation of an observation characterizing a state of the environment, and (ii) a spatial embedding, wherein the predicted score for each slot measures a similarity between: (i) the current spatial embedding, and (ii) the spatial embedding corresponding to the slot, wherein the target score for each slot measures a similarity between: (i) a current observation characterizing the state of the environment at the current time step, and (ii) the observation corresponding to the slot; and determining an update to values of the set of spatial embedding neural network parameters based on an error between the predicted scores and the target scores.

In some implementations, the data characterizing the motion of the agent in the environment at the current time step comprises one or more of: speed data characterizing a speed of the agent at the current time step, angular velocity data characterizing an angular velocity of the agent at the current time step, or translational velocity data characterizing a translational velocity of the agent at the current time step.

In some implementations, the current observation characterizing the state of the environment at the current time step comprises an image.

In some implementations, the image is captured from a perspective of the agent at the current time step.

In some implementations, determining the target score for each slot in the external memory comprises: obtaining respective embeddings of the current observation characterizing the current state of the environment and the observation corresponding to the slot; and determining the target score based on a similarity measure between: (i) the embedding of the current observation characterizing the current state of the environment, and (ii) the embedding of the observation corresponding to the slot.

In some implementations, obtaining the embedding of the current observation comprises processing the current observation using an embedding neural network.

In some implementations, the error between the predicted scores and the target scores comprises a cross-entropy error between the predicted scores and the target scores.

In some implementations, the method further comprises determining an update to the spatial embeddings stored in the external memory based on the error between the predicted scores and the target scores.

In some implementations, the spatial embedding neural network does not process the current observation to generate the current spatial embedding for the current time step.

In some implementations, the method further comprises storing a representation of the current observation and the current spatial embedding in a slot in the external memory.

In some implementations, the method further comprises processing second data characterizing the motion of the agent in the environment at the current time step using a second spatial embedding neural network having a set of second spatial embedding neural network parameters to generate a second current spatial embedding for the current time step, wherein each slot in the external memory also stores a second spatial embedding, wherein for each slot in the external memory, the predicted score for the slot additionally measures a similarity between: (i) the second current spatial embedding, and (ii) the second spatial embedding corresponding to the slot; and determining an update to values of the set of second spatial embedding neural network parameters based on the error between the predicted scores and the target scores.

In some implementations, the data characterizing the motion of the agent that is processed by the spatial embedding neural network is a proper subset of the second data characterizing the motion of the agent that is processed by the second spatial embedding neural network.

In some implementations, for each slot in the external memory, determining the predicted score for the slot comprises determining a product of: (i) a similarity measure between the current spatial embedding and the spatial embedding corresponding to the slot, and (ii) a similarity measure between the second current spatial embedding and the second spatial embedding corresponding to the slot.

In some implementations, the method further comprises, for each of the plurality of time steps: processing the current observation and the current spatial embedding using an action selection neural network to generate an action selection output; and selecting an action to be performed by the agent at the current time step using the action selection output.

In some implementations, the action selection output comprises a respective score for each action in a predetermined set of actions.

In some implementations, selecting the action to be performed by the agent at the current time step comprises selecting an action having a highest score.

In some implementations, the action selection neural network is trained using reinforcement learning techniques to encourage the agent to perform a task in the environment.

In some implementations, the task is a navigation task.

In some implementations, for one or more of the plurality of time steps, the action selection neural network additionally processes a goal spatial embedding that was generated by the spatial embedding neural network at a time step when the agent was located in a goal location in the environment.

In some implementations, the spatial embedding neural network comprises a recurrent neural network, and wherein generating the current spatial embedding for the current time step comprises: processing: (i) the data characterizing the motion of the agent in the environment at the current time step, and (ii) an output of the spatial embedding neural network at a preceding time step, using the spatial embedding neural network to update a hidden state of the spatial embedding neural network, wherein the updated hidden state defines the current spatial embedding.

In some implementations, the method further comprises determining an output of the spatial embedding neural network for the current time step, comprising: identifying the updated hidden state of the spatial embedding neural network as the output of the spatial embedding neural network for the current time step.

In some implementations, the method further comprises determining an output of the spatial embedding neural network for the current time step, comprising: determining a respective weight value for each slot in the external memory that characterizes a similarity between: (i) the current observation characterizing the state of the environment at the current time step, and (ii) the observation corresponding to the slot; determining a correction embedding as a linear combination of the spatial embeddings corresponding to the slots in the external memory, wherein each spatial embedding is weighted by the corresponding weight value; determining the output of the spatial embedding neural network based on: (i) the updated hidden state of the spatial embedding neural network, and (ii) the correction embedding.

In some implementations, the method further comprises: processing data characterizing the motion of the agent in the environment at the current time step using an integrated embedding neural network to generate a current integrated embedding for the current time step; determining a predicted score and a target score for each of a plurality of slots in an additional external memory, wherein each slot stores: (i) a spatial embedding, and (ii) an integrated embedding, wherein the predicted score for each slot measures a similarity between: (i) the current integrated embedding, and (ii) the integrated embedding corresponding to the slot, wherein the target score for each slot measures a similarity between: (i) the current spatial embedding, and (ii) the spatial embedding corresponding to the slot; and determining an update to values of the set of integrated embedding neural network parameters based on an error between the predicted scores and the target scores for the slots in the additional external memory.

According to another aspect, there are provided one or more (non-transitory) computer storage media storing instructions that when executed by one or more computers cause the one or more computers to perform the operations of the respective methods described herein.

According to another aspect, there is provided a system comprising: one or more computers; and one or more storage devices communicatively coupled to the one or more computers, wherein the one or more storage devices store instructions that, when executed by the one or more computers, cause the one or more computers to perform the operations of the respective methods described herein.

Particular embodiments of the subject matter described in this specification can be implemented so as to realize one or more of the following advantages.

The system described in this specification can train a spatial embedding neural network that continuously (i.e., over multiple time steps) processes data characterizing the motion (e.g., angular and translational velocity) of an agent to generate a respective spatial embedding for each time step. In particular, the system can train the spatial embedding neural network to process the motion data to generate spatial embeddings that are predictive of observations characterizing the state of the environment, e.g., images of the environment captured by a camera of the agent. Spatial embeddings generated by the spatial embedding neural network can implicitly characterize the position of the agent in the environment.

An action selection system can process spatial embeddings generated by the spatial embedding neural network to select actions to solve tasks, e.g., that involve navigating through complex, unfamiliar, and changing environments. Processing spatial embeddings generated by the spatial embedding neural network can enable the action selection system to solve tasks more efficiently (e.g., quickly) than it otherwise would, because the spatial embeddings encode rich spatial information content and provide an efficient basis-set for representing spatial information. For example, processing the spatial embeddings can enable the action selection system to select actions that cause the agent to navigate to a goal location using direct (or approximately direct) routes that can cover areas of the environment that were not previously visited by the agent. In particular, processing the spatial embeddings can enable the action selection system to exploit the rich spatial information encoded in the spatial embeddings to select actions that cause the agent to take shortcuts that result in the agent reaching goal locations (or otherwise accomplishing tasks) more efficiently than some other systems.

Processing spatial embeddings generated by the spatial embedding neural network can also enable the action selection system to be trained to reach an acceptable level of performance (i.e., in solving tasks) over fewer training iterations than some other systems, thereby reducing consumption of computational resources during training. Computational resources can include, e.g., memory and computing power.

After being trained, the spatial embedding neural network can generate spatial embeddings that enable the agent to efficiently navigate through new (i.e., previously unseen) environments without the spatial embedding neural network being retrained on training data characterizing interaction of the agent with the new environments.

The system described in this specification can jointly train multiple spatial embedding neural networks, each of which can be configured to process a different set of data characterizing the motion of the agent at each time step. For example, one spatial embedding neural network can be configured to process data characterizing the angular velocity of the agent at each time step, and another spatial embedding neural network can be configured to process data characterizing the both the angular velocity and the translational velocity of the agent at each time step. The spatial embeddings generated by each spatial embedding neural network can have different properties and be complementary to one another, e.g., one might generate spatial embeddings that depend substantially on the heading of the agent, while another might generate spatial embeddings that depend substantially on the distance of the agent to other objects in the environment at a particular heading. The set of spatial embeddings generated by the respective spatial embedding neural networks can collectively characterize the position of the agent in a variety of complementary ways. Processing the set of spatial embeddings generated by the spatial embedding neural networks can enable the action selection system to select actions that allow the agent to accomplish tasks more effectively.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
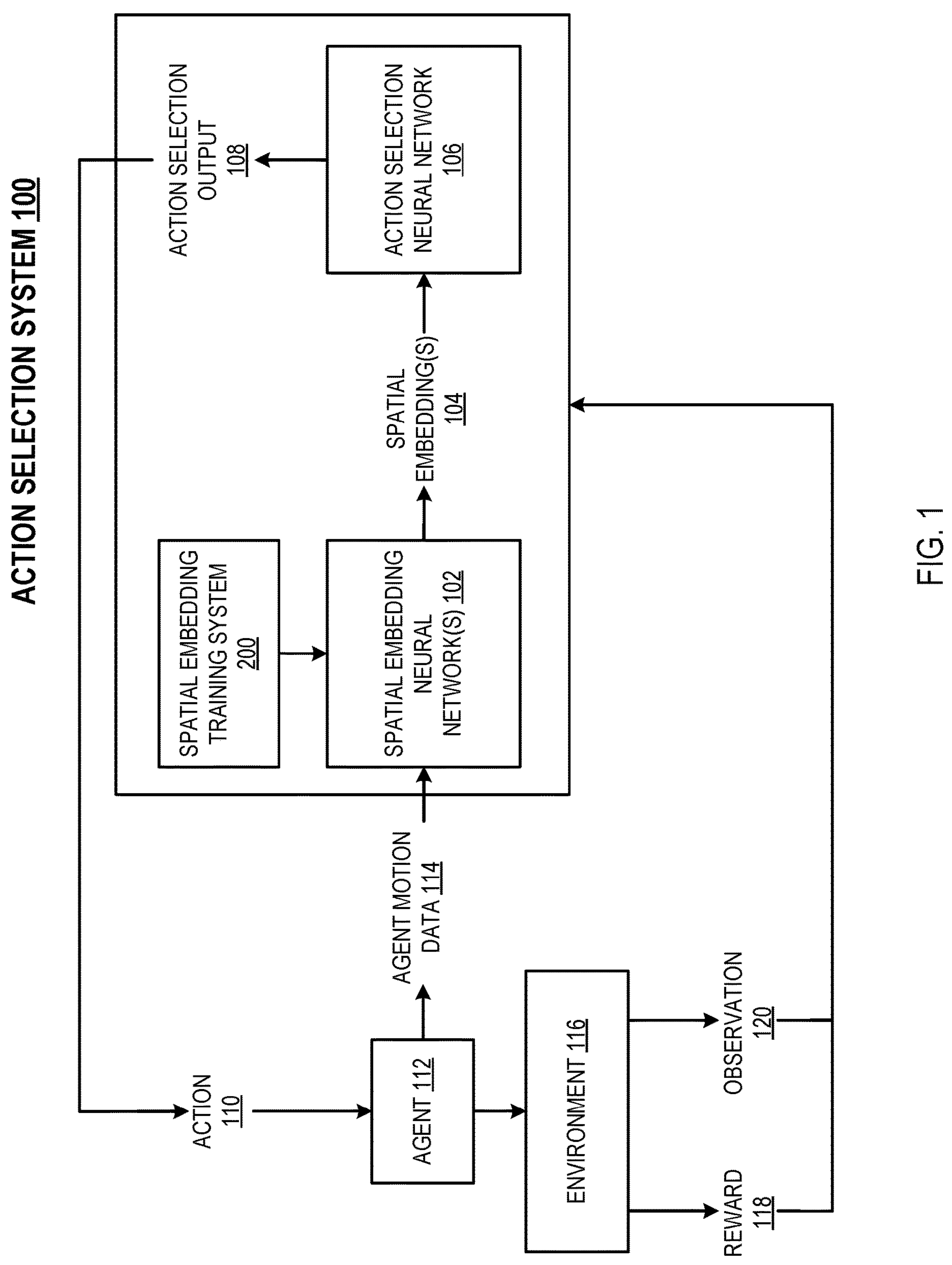
FIG. 1 is a block diagram of an example action selection system.

FIG. 1 is a block diagram of an example action selection system 100. The action selection system 100 is an example of a system implemented as computer programs on one or more computers in one or more locations in which the systems, components, and techniques described below are implemented.

The system 100 selects actions 110 to be performed by an agent 112 interacting with an environment 116 at each of multiple time steps to perform a task that involves navigating through the environment. The task can be, e.g., navigating through the environment to locate an object in the environment, navigating through the environment to reach a specified destination in the environment (referred to as a "goal location"), or navigating through the environment to visit as many locations as possible in the environment as possible (e.g., to explore the environment).

In some implementations, the environment is a real-world environment and the agent is a mechanical agent navigating through the real-world environment. For example, the agent may be a robot or an autonomous or semi-autonomous land, sea, or air vehicle. In other implementations, the environment is a simulated environment and the agent is implemented as one or more computer programs interacting with the simulated environment. For example, the simulated environment can be a motion simulation environment, e.g., a driving simulation or a flight simulation, and the agent can be a simulated vehicle navigating through the motion simulation.

At each time step, the system 100 receives motion data 114 characterizing the current motion of the agent in the environment at the time step and an observation 120 characterizing the current state of the environment at the time step. The system 100 processes the motion data 114 and the observation 120 for the time step to select an action to be performed by the agent 112 at the time step.

The motion data 114 at each time step can include one or more of: speed data characterizing a speed of the agent at the time step, angular velocity data characterizing an angular velocity of the agent at the time step, or translational velocity data characterizing a translational velocity of the agent at the time step. The speed data can be represented as one or more scalar values, e.g., representing the speed of the agent in meters per second, or any other appropriate unit or, e.g., as sin and cos of angular velocity in radians per second. The angular velocity data can be represented, e.g., as a scalar value representing the rate at which the agent rotates about a vertical axis in radians per second, or any other appropriate unit. The translational velocity data can be represented as a two-dimensional (2D) vector [u, v], e.g., where u and v are expressed in units of meters per second, or any other appropriate unit.

The observation 120 at each time step can be generated by or derived from sensors of the agent at the time step. For example, the observation at the time step can include data characterizing the visual appearance or geometry of the environment from the perspective of the agent at the time step, e.g., by one or more images (e.g., color images) captured by a camera sensor of the agent, one or more hyperspectral images captured by a hyperspectral sensor of the agent, or images in the form of geometric data (e.g., a 3D point cloud) captured by a laser sensor of the agent (e.g., a Lidar sensor), or a combination thereof. In the case of a simulated environment, the observation at each time step can be a simulated observation characterizing the visual appearance or geometry of the simulated environment from the perspective of the agent at the time step.

The action 110 performed by the agent at each time step can control the movement of the agent in the environment, e.g., by changing the translational velocity of the agent, the angular velocity of the agent, or both. The actions can be represented, e.g., as control signals to control the agent. Each action can represent, e.g., a respective torque that should be applied to a joint of the agent, an acceleration action to change the acceleration of the agent, or a steering action to change the heading of the agent. In some implementations, the actions can be multi-dimensional actions, e.g., such that each action includes both a respective acceleration control signal and a respective steering control signal.

At each time step, the system 100 can receive a reward 118 based on the current state of the environment 116 and the action 110 performed by the agent 112 at the time step. The reward 118 can be represented a numerical value. The reward 118 can indicate whether the agent 112 has accomplished a task in the environment, or the progress of the agent 112 towards accomplishing a task in the environment. For example, if the task specifies that the agent should navigate through the environment to a goal location, then the reward at each time step may have a positive value once the agent reaches the goal location, and a zero value otherwise. As another example, if the task specifies that the agent should explore the environment, then the reward at a time step may have a positive value if the agent navigates to a previously unexplored location at the time step, and a zero value otherwise.

The action selection system 100 includes one or more spatial embedding neural networks 102, a spatial embedding training system 200, and an action selection neural network 106, which are each described in more detail next.

Each spatial embedding neural network 102 is configured to, at each time step, process a subset, e.g. a so-called proper subset, of the agent motion data 114 for the time step to generate a respective spatial embedding 104 for the time step. A spatial embedding 104 generated by a spatial embedding neural network 102 is an embedding that implicitly characterizes the position of the agent in the environment at the time step.

In implementations where the system 100 includes a single spatial embedding neural network 102, the single spatial embedding neural network 102 can process all of the agent motion data 114 at each time step. In implementations where the system 100 includes multiple spatial embedding neural networks 102, each spatial embedding neural network can process a different subset of the agent motion data 114 at each time step. For example, one spatial embedding neural network can be configured to process data characterizing the angular velocity of the agent at each time step, and another, second spatial embedding neural network can be configured to process data characterizing the both the angular velocity and the translational velocity of the agent at each time step. Depending on the agent motion data they receive the spatial embeddings generated by each spatial embedding neural network can have different properties and be complementary to one another. For example one, receiving e.g. angular velocity data, might generate spatial embeddings that depend substantially on the heading of the agent, while another, receiving e.g. angular and translational velocity data, might generate spatial embeddings that depend substantially on the distance of the agent to other objects in the environment at a particular heading.

In implementations a spatial embedding neural network that receives agent motion data comprising only angular velocity can generate spatial embeddings that encode the heading of the agent e.g. in which activation of neural network units generating the spatial embeddings have an "activation bump" that encodes the heading. The spatial embeddings, in particular such an activation bump, may encode the heading relative to a visual cue in the environment.

Each spatial embedding neural network 102 can have any appropriate neural network architecture that enables it to perform its described function, i.e., processing agent motion data 114 to generate corresponding spatial embeddings 104. In particular, each spatial embedding neural network 102 can include any appropriate types of neural network layers (e.g., recurrent layers, attention layers, fully-connected layers, convolutional layers, etc.) in any appropriate numbers (e.g., 5 layers, 25 layers, or 125 layers), and connected in any appropriate configuration (e.g., as a linear sequence of layers).

In some implementations, each spatial embedding neural network 102 can be a recurrent neural network (e.g., a neural network with one or more recurrent neural network layers, e.g., long short-term memory (LSTM) layers, or any other appropriate recurrent neural network layers) that maintains a respective hidden state. The hidden state of the spatial embedding neural network 102 at each time step can define the spatial embedding 104 generated by the spatial embedding neural network 102 at the time step. Each spatial embedding neural network can update its hidden state at each time step by processing: (i) agent motion data 114 for the time step, and (ii) data generated by the spatial embedding neural network 102 at the previous time step. An example process for processing agent motion data 114 for a time step using a spatial embedding neural network 102 implemented as a recurrent neural network is described in more detail with reference to FIG. 5. (If the spatial embedding neural network is implemented as a recurrent neural network with multiple recurrent neural network layers that each maintain a respective hidden state, then the hidden state of the spatial embedding neural network can be understood as the concatenation of the respective hidden states of one or more of the recurrent neural network layers).

At each time step, the action selection neural network 106 receives an input that includes: (i) the current spatial embeddings 104 generated by the spatial embedding neural networks 102 at the time step, and (ii) the current observation 120 characterizing the state of the environment at the time step. Optionally, the input received by the action selection neural network 106 can include additional data, e.g., the reward 118 received at the previous time step, a representation of the action 110 performed at the previous time step, or both. In some cases, the task being performed by the agent involves repeatedly navigating to a "goal" location in the environment, and the input received by the action selection neural network 106 can include "goal" spatial embeddings. The goal spatial embeddings can be spatial embeddings that were generated by the spatial embedding neural networks 102 at a previous time step when the agent was located at the goal location in the environment.

The action selection neural network 106 processes its input to generate an action selection output 108, and the system 100 selects the action 110 to be performed by the agent 112 at the time step based on the action selection output 108. For example, the action selection output 108 can include a respective action score for each action in a set of possible actions, and the system 100 can select the action 110 to be performed by the agent at the time step using the action scores. In one example, the system 100 can select the action having the highest action score as the action to be performed at the time step. In another example, the system 100 can process the action scores (e.g., using a soft-max function) to determine a probability distribution over the set of possible actions, and then sample the action to be performed at the time step in accordance with the probability distribution.

In some implementations, the system 100 can select the action to be performed at each time step in accordance with an exploration policy, e.g., an $\epsilon$-greedy exploration policy. In an $\epsilon$-greedy exploration policy, the system 100 selects an action randomly from the set of possible action with probability $\epsilon$, and the system 100 selects an action using the action selection output 108 for the time step with probability $1-\epsilon$ (where $\epsilon>0$ is a small positive value). Selecting actions to be performed by the agent in accordance with an exploration policy can enable the agent to explore the environment rapidly and thereby generate a higher diversity of training data that can facilitate more effective training of the action selection neural network 106.

The action selection neural network 106 can have any appropriate neural network architecture that enables it to perform its described functions, e.g., processing spatial embeddings and observations to generate action selection outputs for use in selecting actions to be performed by the agent. For example, the action selection neural network architecture can include any appropriate types of neural network layers (e.g., recurrent layers, attention layers, fully-connected layers, convolutional layers, etc.) in any appropriate numbers (e.g., 5 layers, 25 layers, or 125 layers), and connected in any appropriate configuration (e.g., as a linear sequence of layers).

The spatial embedding training system 200 is configured to train the spatial embedding neural networks 102 to generate spatial embeddings that encode rich spatial information content and provide an efficient basis-set for representing spatial information. In particular, the training system 200 trains the spatial embedding neural networks 102 to process data characterizing the motion of the agent to generate spatial embeddings 104 that are predictive of observations characterizing the state of the environment. More specifically, the training system 200 trains the spatial embedding neural networks 102 to generate spatial embeddings, based on the motion of the agent, that are predictive of the visual or geometric appearance of the environment from the perspective of the agent. An example of a spatial embedding training system 200 for training the spatial embedding neural networks 102 is described in more detail with reference to FIG. 2.

Processing the spatial embeddings 104 generated by the spatial embedding neural networks 102 can enable the system 100 to select actions to efficiently solve complex navigation tasks, e.g., that involve navigating through unfamiliar and changing environments. For example, processing the spatial embeddings can enable the system 100 to select actions that cause the agent to navigate to a goal location using direct (or approximately direct) routes that can cover areas of the environment that were not previously visited by the agent.

The spatial embedding training system 200 can train the spatial embedding neural networks 102 based on trajectories representing agent interaction with one or more environments. Each trajectory can include, for each time step, data representing the agent motion at the time step and the observation of the state of the environment at the time step. After being trained based on trajectories representing agent interaction with one or more environments, the spatial embedding neural networks 102 can be used by the action selection system to control an agent interacting with a new environment without being retrained on trajectories representing agent interaction with the new environment. That is, the trained parameter values of the spatial embedding neural networks 102 can generalize to new environments without being retrained based on agent interaction with the new environment.

The system 100 trains the action selection neural network 106 using a reinforcement learning technique to select actions that increase a cumulative measure of rewards (e.g., a time-discounted sum of rewards) received by the system 100 as a result of the interaction of the agent with the environment. More specifically, the system 100 trains the action selection neural network 106 by iteratively adjusting the values of some or all of the parameters of the action selection neural network 106 using gradients of a reinforcement learning objective function. The system 100 can train the action selection neural network 106 using any appropriate reinforcement learning techniques, e.g., actor-critic techniques or Q-learning techniques. Optionally, the system 100 can train the action selection neural network 106 independently of the spatial embedding neural networks 102, e.g., such that gradients of the reinforcement learning objective function are not backpropagated into the spatial embedding neural networks 102.

Generally, the system 100 can be used to control an agent interacting with either a simulated environment or a real-world environment as described above. In some cases, the system 100 can be used to control an agent interacting with a simulated environment, and the system 100 (in particular, the spatial embedding neural networks 102 and the action selection neural network 106) can be trained based on the agent interaction with the simulated environment. The agent can then be deployed in a real-world environment, and the trained system 100 can be used to control the interaction of the agent with the real-world environment. Training the system 100 based on interactions of the agent with a simulated environment (i.e., instead of a real-world environment) can avoid wear-and-tear on the agent and can reduce the likelihood that, by performing poorly chosen actions, the agent can damage itself or aspects of its environment.

Figure 2:
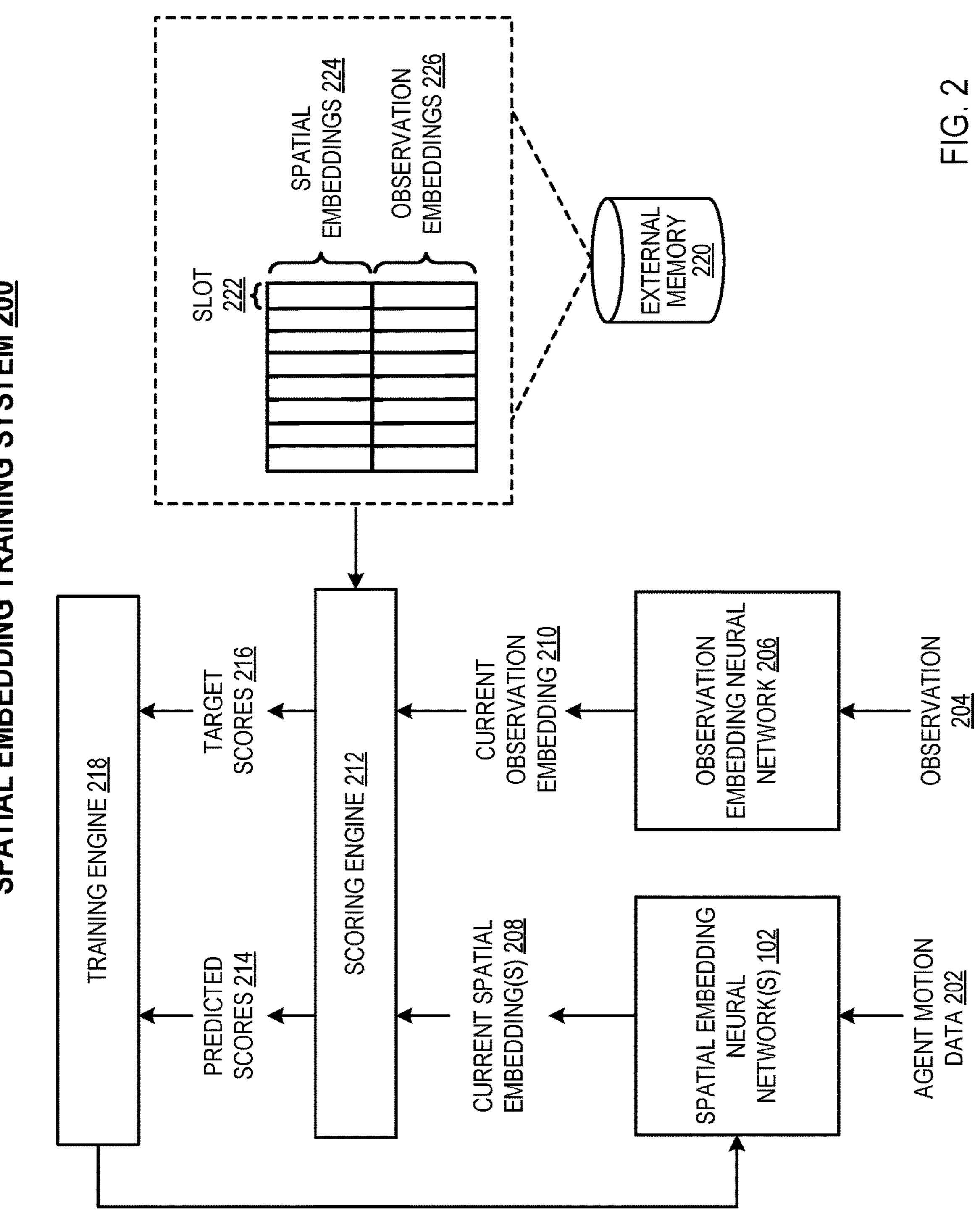
FIG. 2 is a block diagram of an example spatial embedding training system.

FIG. 2 is a block diagram of an example spatial embedding training system 200. The spatial embedding training system 200 is an example of a system implemented as computer programs on one or more computers in one or more locations in which the systems, components, and techniques described below are implemented.

The training system 200 trains one or more spatial embedding neural networks 102, e.g., that are included in an action selection system, as described with reference to FIG. 1.

Each spatial embedding neural network 102 is configured to process respective agent motion data 202 characterizing the motion of an agent in an environment at a time step to generate a spatial embedding 208 that implicitly characterizes the position of the agent in the environment at the time step.

The training system 200 includes an observation embedding neural network 206, an external memory 220, a scoring engine 212, and a training engine 218, which are each described in more detail next.

The observation embedding neural network 206 is configured to process an observation 204 characterizing the state of the environment to generate an embedding 210 of the observation 204. The training system 200 can train the observation embedding neural network 206 to perform an auto-encoding task on a training set of environment observations before using the observation embedding neural network as part of training the spatial embedding neural networks 102. To perform an auto-encoding task, the observation embedding neural network 206 processes an observation to generate a corresponding observation embedding that, when processed by a "decoder" neural network, enables reconstruction of the original observation. Thus in implementations, training of the spatial embedding neural network(s) 102 uses a trained observation embedding neural network 206.

The observation embedding neural network can have any appropriate neural network architecture that enables it to perform its described function, e.g., processing observations to generate observation embeddings. For example, the observation embedding neural network architecture can include any appropriate types of neural network layers (e.g., attention layers, fully-connected layers, convolutional layers, etc.) in any appropriate numbers (e.g., 5 layers, 25 layers, or 125 layers), and connected in any appropriate configuration (e.g., as a linear sequence of layers).

The external memory 220 includes a set of logical data storage spaces, referred to as "slots" 222. Each slot corresponds to a respective time step during the interaction of the agent with the environment, and stores: (i) an observation embedding 226 for the time step, and (ii) a respective spatial embedding 224 for the time step corresponding to each spatial embedding neural network 102.

The training system 200 generates the respective observation embedding 226 stored in each slot of the external memory 220 by processing the observation for the corresponding time step using the observation embedding neural network 206.

The training system generates the respective spatial embeddings 224 stored in each slot of the external memory by processing agent motion data for the corresponding time step using the spatial embedding neural networks 102. The training system 200 can modify the spatial embeddings stored in the slots of the external memory over the course of training, e.g., using gradients of an objective function, as will be described in more detail below.

At each time step in a sequence of time steps, the training system 200 receives: (i) agent motion data 202 characterizing the motion of the agent at the time step, and (ii) an observation 204 characterizing the state of the environment at the time step.

The training system 200 provides the agent motion data 202 for the time step to the spatial embedding neural networks 102, and each spatial embedding neural network 102 processes a respective input based on the agent motion data 202 to generate a respective current spatial embedding 208.

The training system 200 provides the observation 204 for the time step to the observation embedding neural network 206, and the observation embedding neural network 206 processes the observation 204 to generate a current observation embedding 210.

The scoring engine 212 generates: (i) a respective target score 216, and (ii) a respective predicted score 214, for each slot in the external memory 220 based on the current observation embedding 210 and the current spatial embeddings 208.

The target score 216 for each slot in the external memory 220 characterizes a similarity between: (i) the current observation embedding 210, and (ii) the observation embedding stored in the slot in the external memory 220. The scoring engine 212 can generate the target score 216 for each slot based on a similarity measure (e.g., a cosine similarity measure, a Euclidean similarity measure, or any other appropriate similarity measure) between the current observation embedding 210 and the observation embedding stored in the slot in the external memory. In one example, the scoring engine 212 can generate the target score $T_s$ for each slot s as:

$$T_s = \exp\left(\beta y_t^T m_s^{(y)}\right) \tag{1}$$

where β is a positive scalar parameter, $$y_t^T$$

is the transpose of the current observation embedding 210, $$m_s^{(y)}$$

is the observation embedding stored in slot s. The parameter β is an inverse-temperature parameter which may be chosen for sparse selection of memory slots, so that there is low interference between memories.

The predicted score 214 for each slot in the external memory 220 characterizes a similarity between: (i) the current spatial embeddings 208, and (ii) the spatial embeddings stored in the slot in the external memory 220. To generate the predicted score 214 for a slot in the external memory 220, the scoring engine 212 can determine, for each spatial embedding neural network 102, a respective similarity measure between: (i) the current spatial embedding 208 generated by the spatial embedding neural network, and (ii) the spatial embedding corresponding to the spatial embedding neural network that is stored in the slot. The similarity measures can be, e.g., cosine similarity measures, Euclidean similarity measures, or any other appropriate similarity measures. The scoring engine 212 can then determine the predicted score 214 for the slot by aggregating the determined similarity measures between the current spatial embeddings 208 and the spatial embeddings stored in the slot in the external memory 220, e.g., by a product operation, a sum operation, or any other appropriate operation. For example, the scoring engine 212 can generate the predicted score $P_s$ for each slot s as:

$$P_s = \prod_{r=1}^{R} \exp\left(\pi_r x_{r,t}^T m_{r,s}^{(x)}\right) \tag{2}$$

where r indexes the spatial embedding neural networks, R is the number of spatial embedding neural networks, $$\{\pi_r\}_{r=1}^{R}$$

are scalar parameters that determine the relative importance of each spatial embedding neural network, $$x_{r,t}^T$$

is the transpose of the current spatial embedding generated by spatial embedding neural network r, $$m_{r,s}^{(x)}$$

is the spatial embedding corresponding to spatial embedding neural network r stored in slot s.

The training engine 218 receives the predicted scores 214 and the target scores 216 for the time step, and updates the parameter values of the spatial embedding neural network 102 to optimize an objective function that measures an error between the predicted scores 214 and the target scores 216. The objective function can be any appropriate objective function that measures an error between the predicted scores 214 and the target scores, e.g., cross-entropy objective function $\mathcal{L}$ given by:

$$\mathcal{L} \sum_{s=1}^{S} T_s \cdot \log(P_s) \tag{3}$$

where s indexes the slots of the external memory, S is the number of (occupied) slots in the external memory, $T_s$ is the target score for slot s, and $P_s$ is the predicted score for slot s.

To update the spatial embedding neural network parameters, the training engine 218 can determine gradients of the objective function with respect to the spatial embedding neural network parameters, e.g., using backpropagation. The training engine 218 can then use the gradients to update the spatial embedding neural network parameters using any appropriate gradient descent optimization technique, e.g., RMSprop or Adam.

Optionally, in addition to updating the spatial embedding neural network parameters, the training engine 218 can also update a variety of other system parameters using gradients of the objective function. For example, the training engine 218 can additionally update the $$\{\pi_r\}_{r=1}^{R}$$

parameters described with reference to equation (2), the spatial embeddings 224 stored in the external memory 220, or both. A learning rate for the spatial embeddings 224 may be higher than for the spatial embedding neural network parameters, e.g. of order $10^{-2}$ rather than $10^{-4}$, as there is low interference between memories. As previously described, in a new environment the spatial embedding neural network parameters may be frozen whilst storing, and optionally updating, new spatial embeddings 224 in the external memory 220, optionally also retraining the action selection neural network using reinforcement learning.

Training the spatial embedding neural networks to minimize an error between the predicted scores and the target scores encourages the spatial embedding neural networks to generate spatial embeddings that are predictive of observations of the environment. More specifically, the training encourages the spatial embedding neural networks to integrate agent motion data to generate embeddings that are predictive of the visual or geometric appearance of the environment from the perspective of the agent (i.e., as characterized by the observations). In implementations, therefore, the observation embeddings 210 stored in the external memory are not parameters updated by the training engine 218.

Optionally, the training system 200 can, with some predefined probability, store the spatial embeddings 208 and the observation embedding 210 generated at the time step in a slot in the external memory. If one or more slots in the external memory are empty, then the training system 200 can store the spatial embeddings 208 and the observation embedding 210 in an empty slot. Otherwise, the training system 200 can, optionally with a lower probability, store the spatial embeddings 208 and the observation embedding 210 in the external memory by overwriting the data currently stored in a slot. For example the slots may be initialized blank, overwritten with first probability, e.g. p=0.01 until the slots are full, then overwritten with a second, lower probability, e.g. p=0.001.

In some implementations, the training system 200 can train one or more additional neural networks, referred to as "integrated embedding neural networks," that are each configured to process some or all of the agent motion data 202 at each time step to generate a corresponding embedding, referred to as an "integrated embedding" for the time step. Optionally, each integrated embedding neural network can process one or more additional inputs at each time step (i.e., in addition to the agent motion data for the time step), e.g., spatial embeddings generated by one or more of the spatial embedding neural networks at the time step. Similar to the spatial embeddings generated by the spatial embedding neural networks, the integrated embeddings generated by the integrated embedding neural networks can be provided as inputs to the action selection neural network (i.e., of the action selection system described with reference to FIG. 1).

As part of training each integrated embedding neural network, the training system 200 can store, in each slot of the external memory 220 (or in the slots of an additional external memory), a respective integrated embedding for the time step corresponding to the slot. The training system generates the respective integrated embedding stored in each slot of the external memory by processing agent motion data (and any other appropriate inputs) for the corresponding time step using the integrated embedding neural network. The training system can modify the integrated spatial embeddings stored in the slots of the external memory over the course of training, e.g., using gradients of an objective function, as will be described in more detail below.

To train an integrated embedding neural network, at each time in a sequence of time steps, the training system determines an "integrated" predicted score and an "integrated" target score for each slot in the external memory. The training system generates the integrated predicted score for the slot based on a similarity between: (i) the current integrated embedding generated by the integrated embedding neural network for the time step, and (ii) the integrated embedding corresponding to the slot in the external memory. The training system can generate the integrated predicted scores using any appropriate similarity measure, e.g., a Euclidean similarity measure, a cosine similarity measure, or the similarity measure described with reference to equation (1).

The training system further generates an integrated target score for each slot that measures a similarity between: (i) one or current spatial embedding generated by the spatial embedding neural network for the time step, and (ii) one or more of the spatial embedding corresponding to the slot. For example, the training system can generate the integrated target scores using any appropriate similarity measure (e.g., a Euclidean similarity measure or a cosine similarity measure) to measure a similarity between: (i) the concatenation of one or more current spatial embedding for the time step, and (ii) the concatenation of one or more spatial embeddings corresponding to the slot.

The training system can update the parameter values of the integrated embedding neural networks, and can optionally update the integrated embeddings stored in the slots of the external memory, to optimize an objective function that measures an error between the integrated predicted scores and the integrated target scores. The objective function can be, e.g., a cross-entropy objective function, e.g., as described with reference to equation (3). The training system can update the parameter values of the integrated embedding neural networks, e.g., by backpropagating gradients of the objective function into the integrated neural networks.

Figure 3:
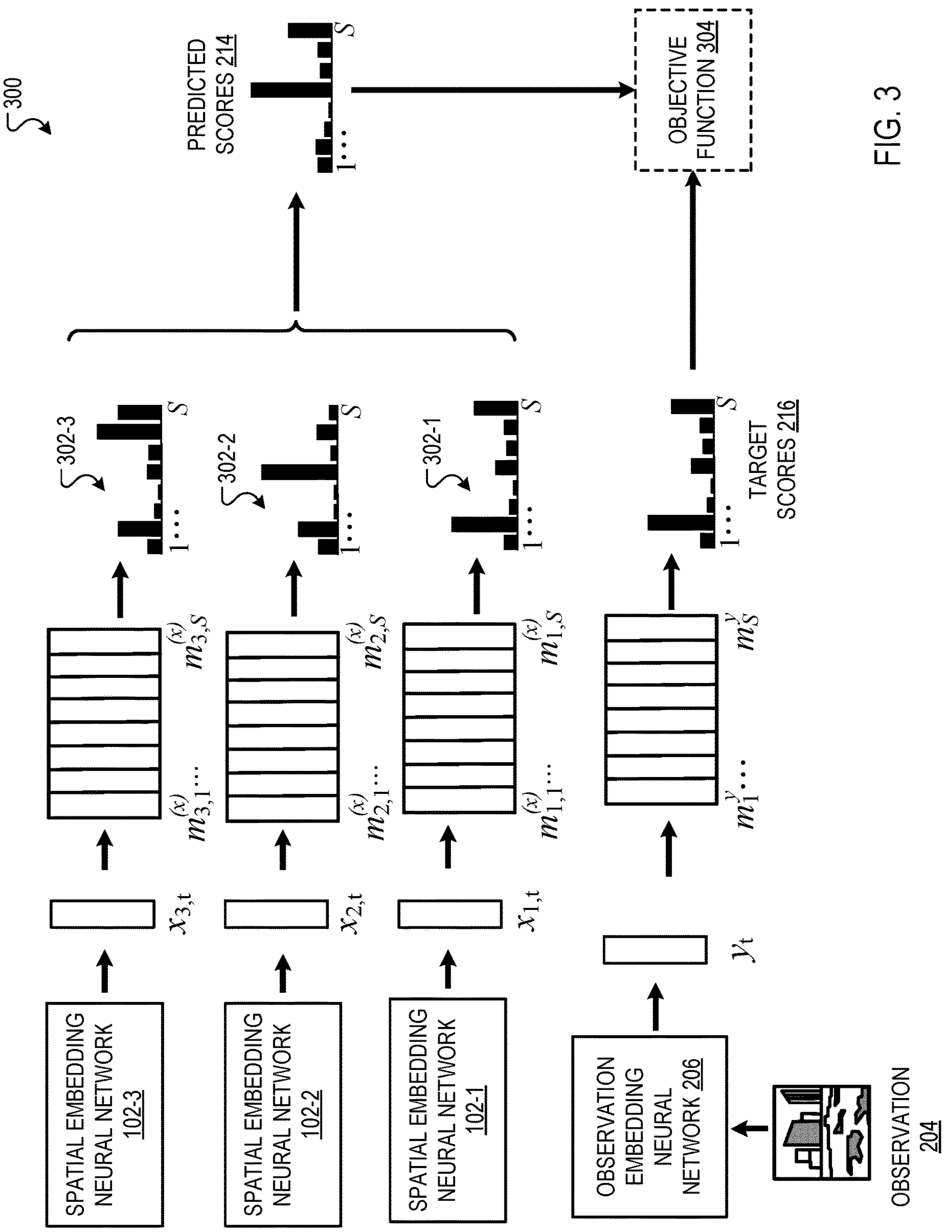
FIG. 3 shows a data flow that illustrates operations performed by a spatial embedding training system.

FIG. 3 shows a data flow 300 that illustrates the operations performed by the spatial embedding training system 200 that is described in more detail with reference to FIG. 2.

At each time step, the training system 200 processes the observation 204 for the time step using an observation embedding neural network 206 to generate a current observation embedding $y_t$. The training system 200 can then determine a respective target score 216 corresponding to each slot in the external memory based on a respective similarity measure between: (i) the current observation embedding $y_t$, and (ii) each of the observation embeddings $$m_1^y, \ldots, m_s^y$$

stored in respective slots of the external memory, e.g., as described above with reference to equation (1).

At each time step, the training system 200 processes respective agent motion data using each spatial embedding neural network 102-1-102-3 to generate respective current spatial embeddings $x_{1,t}$, $x_{2,t}$, $x_{3,t}$. The training system 200 can then determine, for each spatial embedding neural network $r \in \{1, 2, 3\}$, a set of similarity measures (shown as 302-1-302-3) based on a respective similarity measure between: (i) the current spatial embedding $x_{r,t}$ generated by spatial embedding neural network r, and (ii) each of the spatial embeddings $$m_{r,1}^x, \ldots, m_{r,S}^x$$

corresponding to spatial embedding neural network r that are stored in respective slots of the external memory. The training system 200 then aggregates the sets of similarity measures 302-1-302-3 (e.g., by a product operation) to determine a respective predicted score 214 corresponding to each slot in the external memory.

At each time step, the training system 200 determines gradients of an objective function 304 (e.g., a cross-entropy objective function) that measures an error between the target scores 216 and the predicted scores 214, and uses the gradients to update the parameter values of the spatial embedding neural networks.

Figure 4:
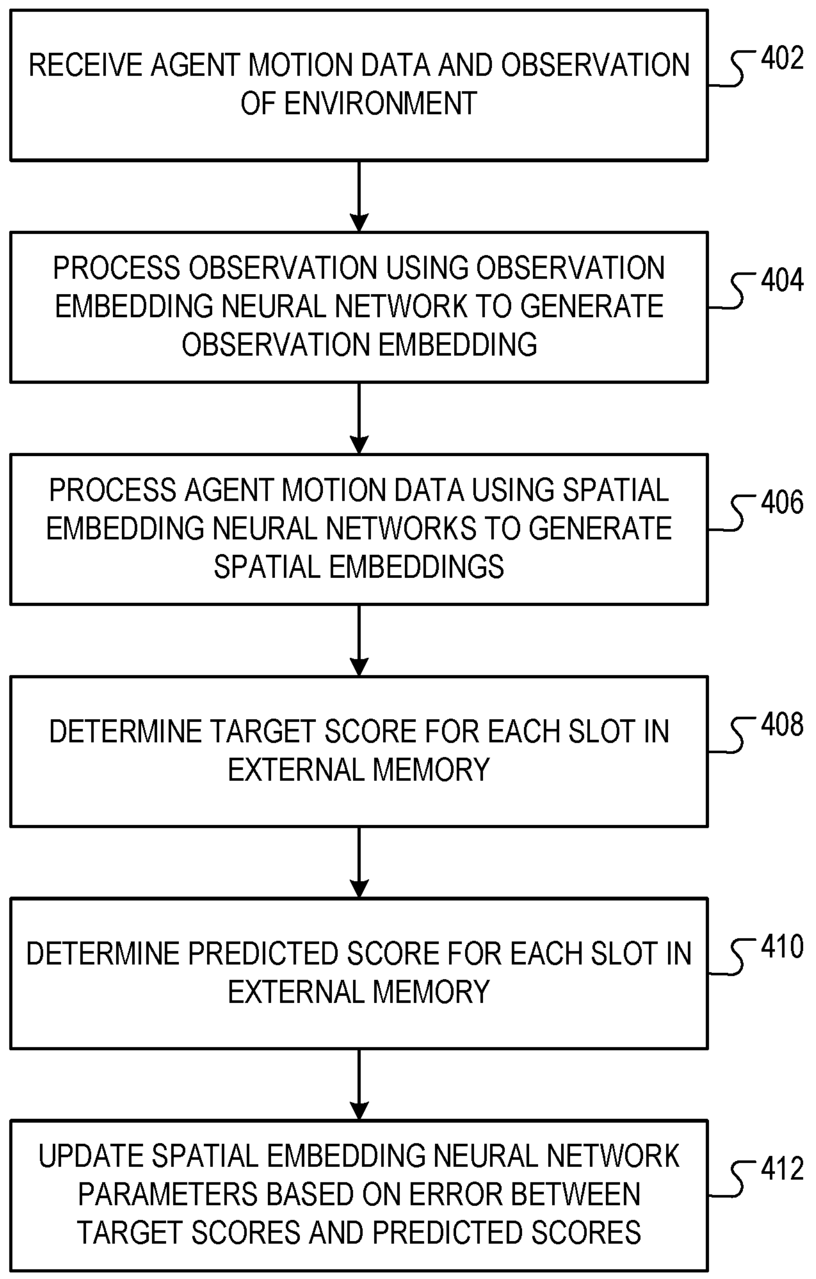
FIG. 4 is a flow diagram of an example process for training one or more spatial embedding neural networks.

FIG. 4 is a flow diagram of an example process 400 for training one or more spatial embedding neural networks. For convenience, the process 400 will be described as being performed by a system of one or more computers located in one or more locations. For example, a training system, e.g., the spatial embedding training system 200 of FIG. 2, appropriately programmed in accordance with this specification, can perform the process 400.

Generally, the steps of the process 400 are performed for each time step in a sequence of time steps over which the agent interacts with the environment. For convenience, the description of the process 400 which follows refers to a current time step in the sequence of time steps.

The system receives data characterizing the motion of the agent in the environment at the current time step and an observation characterizing the state of the environment at the current time step (402). The agent motion data can include one or more of: speed data characterizing a speed of the agent at the current time step, angular velocity data characterizing an angular velocity of the agent at the current time step, or translational velocity data characterizing a translational velocity of the agent at the current time step. The observation can include, e.g., an image captured by a camera of the agent that depicts the visual appearance of the environment from the perspective of the agent at the time step.

The system processes the observation using an observation embedding neural network to generate an embedding of the observation (404). The observation embedding neural network can be, e.g., a convolutional neural network that is trained to perform an auto-encoding task, i.e., by generating observation embeddings that, when processed by a decoder neural network, enable reconstruction of the original observation. In some cases, the observation embedding neural network is a dimensionality-reducing neural network, i.e., such that the observation embedding has a lower dimensionality than the observation itself.

The system processes a respective subset of the agent motion data using each spatial embedding neural network to generate a respective spatial embedding using each spatial embedding neural network (406). An example process for generating a spatial embedding using a spatial embedding neural network is described in more detail below with reference to FIG. 5.

The system determines a respective target score for each slot in an external memory based on the current observation embedding (408). Each slot in the external memory corresponds to a respective previous time step and stores: (i) an embedding (representation) of an observation characterizing the state of the environment at the previous time step, and (ii) a respective spatial embedding for the time step corresponding to each spatial embedding neural network. The system determines the target score for each slot in the external memory based on a similarity measure between: (i) the current observation embedding, and (ii) the observation embedding stored at the slot in the external memory, e.g., as described above with reference to equation (1).

The system determines a respective predicted score for each slot in the external memory based on the current spatial embeddings (410). To generate the predicted score for a slot in the external memory, the system can determine, for each spatial embedding neural network, a respective similarity measure between: (i) the current spatial embedding generated by the spatial embedding neural network, and (ii) the spatial embedding corresponding to the spatial embedding neural network that is stored in the slot. The system can then determine the predicted score for the slot by aggregating the determined similarity measures between the current spatial embeddings and the spatial embeddings stored in the slot in the external memory, e.g., as described above with reference to equation (2).

The system updates the parameter values of each spatial embedding neural network parameters based on an error between the predicted scores and the target scores (412). For example, the system can determine gradients of an objective function (e.g., a cross-entropy objective function) that measures an error between the predicted scores and the target scores, and backpropagate gradients of the objective function into the spatial embedding neural network parameters.

Figure 5:
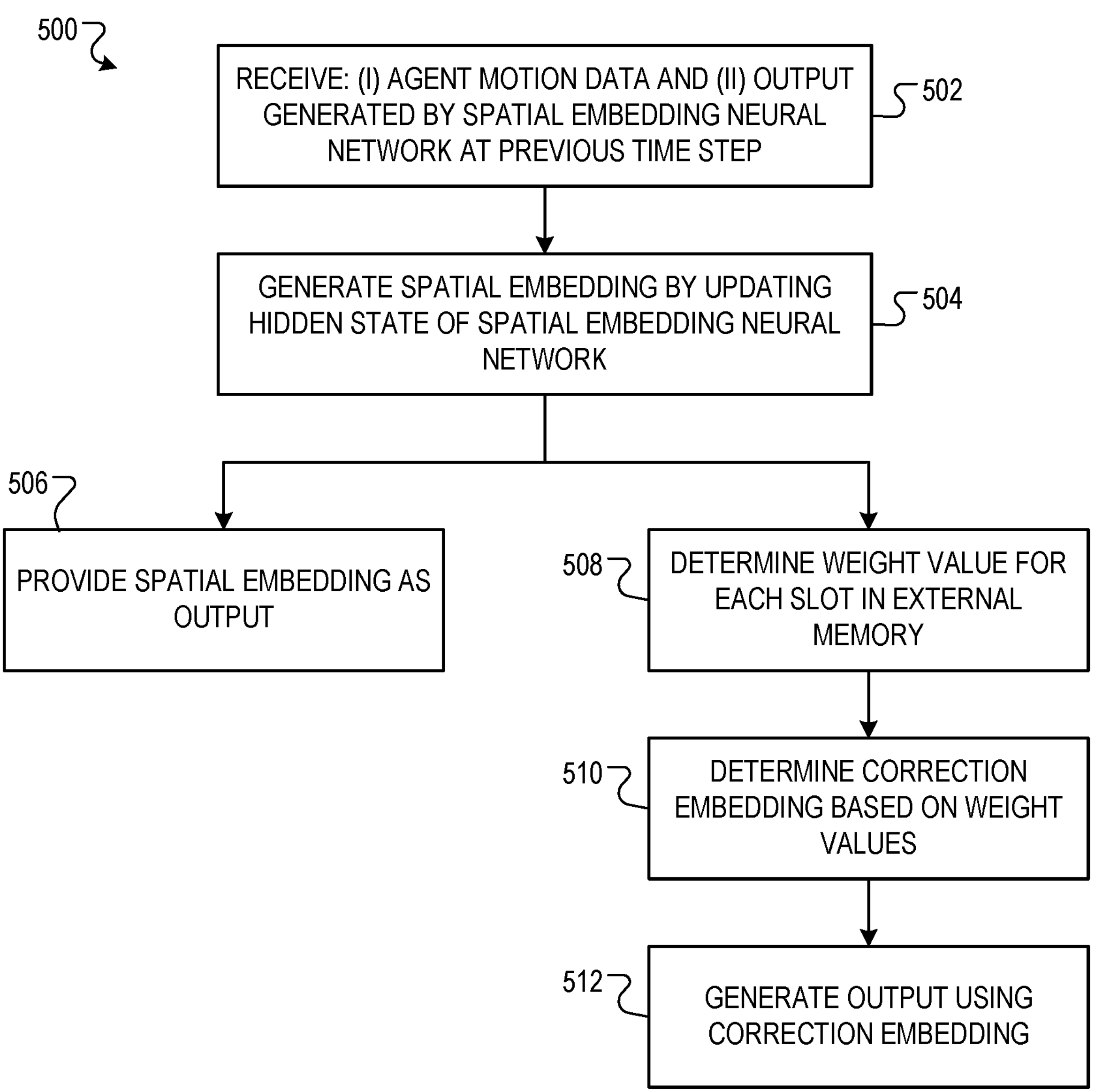
FIG. 5 is a flow diagram of an example process for generating a spatial embedding for a time step using a spatial embedding neural network that has a recurrent neural network architecture.

FIG. 5 is a flow diagram of an example process 500 for generating a spatial embedding for a time step using a spatial embedding neural network that has a recurrent neural network architecture. For convenience, the process 500 will be described as being performed by a system of one or more computers located in one or more locations. For example, a training system, e.g., the spatial embedding training system 200 of FIG. 2, appropriately programmed in accordance with this specification, can perform the process 500.

The system receives a network input for the spatial embedding neural network that includes: (i) agent motion data characterizing the motion of the agent at the time step, and (ii) an output generated by the spatial embedding neural network at the previous time step (502). The output generated by the spatial embedding neural network at the previous time step can be, e.g., the spatial embedding for the previous time step, or an alternative output generated based in part on the observation at the previous time step. Generating an alternative output of the spatial embedding neural network that is based in part on the observation at the time step is described in more detail with reference to steps 508-512.

The system processes the network input using the spatial embedding neural network to update a hidden state of the spatial embedding neural network (504). The updated hidden state of the spatial embedding neural network defines the spatial embedding for the time step. In one example, the updated hidden state $h_t$ of the spatial embedding neural network may be given by:

$$h_t=\sigma(Wh_{t-1}+Vx_t+b) \tag{4}$$

where $\sigma(\cdot)$ is an element-wise sigmoid function, W, V, and b are weight matrices, $h_{t-1}$ is the hidden state of the spatial embedding neural network as of the previous time step, and $x_t$ is the network input.

The system can provide the updated hidden state as the output of the spatial embedding neural network for the time step (506).

Optionally, as an alternative to identifying the updated hidden state as the output of the spatial embedding neural network, the system can generate an alternative output that is based in part on the observation at the time step, as will be described with reference to steps 508-512. The system can generate the alternative output that is based in part on the observation for the time step at time steps that are selected randomly, e.g., with probability p=0.1. Generating an alternative output that is based in part on the observation for the time step can enable the spatial embedding neural network to correct for the accumulation of errors and to incorporate positional and directional information from the observation into the hidden state at the next time step.

To generate an alternative output for the time step that is based on the observation for the time step, the system determines a respective weight value for each slot in the external memory (508). The system can determine the respective weight value for each slot based on a similarity measure between: (i) an embedding of the current observation, and (ii) the observation embedding stored in the slot. For example, the system can determine the weight value $w_s$ for slot s as:

$$w_s=\frac{\exp\left(\gamma y_t^T m_s^{(y)}\right)}{\sum_{s'=1}^{S}\exp\left(\gamma y_t^T m_{s'}^{(y)}\right)} \tag{5}$$

where $\gamma$ is a positive scalar parameter that determines the entropy of the distribution of weights, $$y_t^T$$

is the transpose of the current observation embedding, $$m_s^{(y)}$$

is the observation embedding stored in slot s of the external memory, s' indexes the slots, S is the total number of slots. In implementations $\gamma$ is one of the parameters optimized by the training engine 218.

The system determines a "correction" embedding based on the weight values for the slots in the external memory (510). For example, the system can determine the correction embedding $\tilde{x}$ as:

$$\tilde{x} = \sum_{s=1}^{S} w_s \cdot m_s^{(x)} \tag{6}$$

where s indexes the slots in the external memory, S is the number of slots, $w_s$ is the weight value for slot s, and $$m_s^{(x)}$$

is the spatial embedding corresponding to the spatial embedding neural network that is stored in slot s.

The system generates the output for the time step using the correction embedding (512). For example, the system can process: (i) the updated hidden state of the spatial embedding neural network, and (ii) the correction embedding, using one or more neural network layers (e.g., recurrent layers) of the spatial embedding neural network to generate the output for the time step. The output for the time step can be an embedding having the same dimensionality as the hidden state of the spatial embedding neural network. The output for the time step, which depends on the observation for the time step, can be provided as an input to the spatial embedding neural network at the next time step and processed as part of updating the hidden state of the spatial embedding neural network at the next time step. By incorporating information from the observation (e.g., visual information from an observation that includes an image) into hidden state of the spatial embedding neural network at the next time step, the spatial embedding neural network can correct errors in the spatial information represented by the hidden state as a result of integrating mainly motion information over a possibly lengthy sequence of time steps.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for selecting actions to be performed by an agent to efficiently navigate an environment to perform a task, the method comprising:

controlling the agent to interact with the environment based on one or more spatial embeddings that encode spatial information for the environment, including repeatedly performing operations comprising:

processing current agent motion data using a spatial embedding neural network to generate a current spatial embedding; and processing at least the current spatial embedding using an action selection neural network to generate a current action selection output; and selecting a current action to be performed by the agent based on the current action selection output;

wherein the spatial embedding neural network has been trained using a training technique comprising, for each of a plurality of time steps:

processing agent motion data characterizing one or more of: a speed of the agent at the time step, an angular velocity of the agent at the time step, or a translational velocity of the agent at the time step, using the spatial embedding neural network to generate a current spatial embedding for the time step;

determining a predicted score and a target score for each of a plurality of slots in an external memory, wherein each slot corresponds to a respective previous time step and stores: (i) a representation of an observation comprising an image characterizing a state of the environment for the respective previous time step, and (ii) a spatial embedding for the respective previous time step generated based on agent motion data for the respective previous time step, wherein the predicted score for each slot measures a similarity between: (i) the current spatial embedding, and (ii) the spatial embedding corresponding to the slot, wherein the target score for each slot measures a similarity between: (i) a current observation comprising a current image characterizing the state of the environment at the time step, and (ii) the observation comprising the image corresponding to the slot; and determining an update to values of a set of spatial embedding neural network parameters based on an error between the predicted scores and the target scores.

2. The method of claim 1, wherein the image is captured from a perspective of the agent at the time step.

3. The method of claim 1, wherein determining the target score for each slot in the external memory comprises:

obtaining respective embeddings of the current observation characterizing the current state of the environment and the observation corresponding to the slot; and determining the target score based on a similarity measure between: (i) the embedding of the current observation characterizing the current state of the environment, and (ii) the embedding of the observation corresponding to the slot.

4. The method of claim 3, wherein obtaining the embedding of the current observation comprises processing the current observation using an embedding neural network.

5. The method of claim 1, wherein the error between the predicted scores and the target scores comprises a cross-entropy error between the predicted scores and the target scores.

6. The method of claim 1, further comprising determining an update to the spatial embeddings stored in the external memory based on the error between the predicted scores and the target scores.

7. The method of claim 1, wherein the spatial embedding neural network does not process the current observation to generate the current spatial embedding for the time step.

8. The method of claim 1, further comprising storing a representation of the current observation and the current spatial embedding in a slot in the external memory.

9. The method of claim 1, wherein the action selection output comprises a respective score for each action in a predetermined set of actions.

10. The method of claim 9, wherein selecting the current action to be performed by the agent based on the current action selection output comprises selecting an action having a highest score.

11. The method of claim 1, wherein the action selection neural network is configured to additionally processes a goal spatial embedding that was generated by the spatial embedding neural network at a time step when the agent was located in a goal location in the environment.

12. The method of claim 1, wherein the spatial embedding neural network comprises a recurrent neural network, and wherein generating the current spatial embedding for the time step comprises:

processing: (i) the agent motion data characterizing one or more of: a speed of the agent at the time step, an angular velocity of the agent at the time step, or a translational velocity of the agent at the time step, and (ii) an output of the spatial embedding neural network at a preceding time step, using the spatial embedding neural network to update a hidden state of the spatial embedding neural network, wherein the updated hidden state defines the current spatial embedding.

13. The method of claim 12, further comprising determining an output of the spatial embedding neural network for the time step, comprising:

identifying the updated hidden state of the spatial embedding neural network as the output of the spatial embedding neural network for the time step.

14. The method of claim 12, further comprising determining an output of the spatial embedding neural network for the time step, comprising:

determining a respective weight value for each slot in the external memory that characterizes a similarity between: (i) the current observation characterizing the state of the environment at the time step, and (ii) the observation corresponding to the slot;

determining a correction embedding as a linear combination of the spatial embeddings corresponding to the slots in the external memory, wherein each spatial embedding is weighted by the respective weight value; and determining the output of the spatial embedding neural network based on: (i) the updated hidden state of the spatial embedding neural network, and (ii) the correction embedding.

15. The method of claim 1, further comprising:

processing agent motion data characterizing one or more of: a speed of the agent at the time step, an angular velocity of the agent at the time step, or a translational velocity of the agent at the time step using an integrated embedding neural network having a set of integrated embedding neural network parameters to generate a current integrated embedding for the time step;

determining a predicted score and a target score for each of a plurality of slots in an additional external memory, wherein each slot stores: (i) a spatial embedding, and (ii) an integrated embedding, wherein the predicted score for each slot measures a similarity between: (i) the current integrated embedding, and (ii) the integrated embedding corresponding to the slot, wherein the target score for each slot measures a similarity between: (i) the current spatial embedding, and (ii) the spatial embedding corresponding to the slot; and determining an update to values of the set of integrated embedding neural network parameters based on an error between the predicted scores and the target scores for the slots in the additional external memory.

16. One or more non-transitory computer storage media storing instructions that when executed by one or more computers cause the one or more computers to perform operations for selecting actions to be performed by an agent to efficiently navigate an environment to perform a task, the operations comprising:

controlling the agent to interact with the environment based on one or more spatial embeddings that encode spatial information for the environment, including repeatedly performing operations comprising:

processing current agent motion data using a spatial embedding neural network to generate a current spatial embedding; and processing at least the current spatial embedding using an action selection neural network to generate a current action selection output; and selecting a current action to be performed by the agent based on the current action selection output;

wherein the spatial embedding neural network has been trained using a training technique comprising, for each of a plurality of time steps:

processing agent motion data characterizing one or more of: a speed of the agent at the time step, an angular velocity of the agent at the time step, or a translational velocity of the agent at the time step, using the spatial embedding neural network to generate a current spatial embedding for the time step;

determining a predicted score and a target score for each of a plurality of slots in an external memory, wherein each slot corresponds to a respective previous time step and stores: (i) a representation of an observation comprising an image characterizing a state of the environment for the respective previous time step, and (ii) a spatial embedding for the respective previous time step generated based on agent motion data for the respective previous time step, wherein the predicted score for each slot measures a similarity between: (i) the current spatial embedding, and (ii) the spatial embedding corresponding to the slot, wherein the target score for each slot measures a similarity between: (i) a current observation comprising a current image characterizing the state of the environment at the time step, and (ii) the observation comprising the image corresponding to the slot; and determining an update to values of a set of spatial embedding neural network parameters based on an error between the predicted scores and the target scores.

17. A system comprising:

one or more computers; and one or more storage devices communicatively coupled to the one or more computers, wherein the one or more storage devices store instructions that, when executed by the one or more computers, cause the one or more computers to perform operations for selecting actions to be performed by an agent to efficiently navigate an environment to perform a task, the operations comprising:

controlling the agent to interact with the environment based on one or more spatial embeddings that encode spatial information for the environment, including repeatedly performing operations comprising:

processing current agent motion data using a spatial embedding neural network to generate a current spatial embedding; and processing at least the current spatial embedding using an action selection neural network to generate a current action selection output; and selecting a current action to be performed by the agent based on the current action selection output;

wherein the spatial embedding neural network has been trained using a training technique comprising, for each of a plurality of time steps:

processing agent motion data characterizing one or more of: a speed of the agent at the time step, an angular velocity of the agent at the time step, or a translational velocity of the agent at the time step, using the spatial embedding neural network to generate a current spatial embedding for the time step;

determining a predicted score and a target score for each of a plurality of slots in an external memory, wherein each slot corresponds to a respective previous time step and stores: (i) a representation of an observation comprising an image characterizing a state of the environment for the respective previous time step, and (ii) a spatial embedding for the respective previous time step generated based on agent motion data for the respective previous time step, wherein the predicted score for each slot measures a similarity between: (i) the current spatial embedding, and (ii) the spatial embedding corresponding to the slot, wherein the target score for each slot measures a similarity between: (i) a current observation comprising a current image characterizing the state of the environment at the time step, and (ii) the observation comprising the image corresponding to the slot; and determining an update to values of a set of spatial embedding neural network parameters based on an error between the predicted scores and the target scores.

18. The system of claim 17, wherein the image is captured from a perspective of the agent at the time step.

19. The system of claim 17, wherein determining the target score for each slot in the external memory comprises:

obtaining respective embeddings of the current observation characterizing the current state of the environment and the observation corresponding to the slot; and determining the target score based on a similarity measure between: (i) the embedding of the current observation characterizing the current state of the environment, and (ii) the embedding of the observation corresponding to the slot.

* * * * *